United States Patent [19]

Custer et al.

[11] 4,250,618
[45] Feb. 17, 1981

[54] PIZZA CUTTER

[76] Inventors: Michael D. Custer, 2317 S. Minnesota, Wichita, Kans. 67214; Gene L. Rorabaugh, 1209 Paige 201, Wichita, Kans. 67202

[21] Appl. No.: 102,025

[22] Filed: Dec. 10, 1979

Related U.S. Application Data

[63] Continuation of Ser. No. 826,148, Aug. 19, 1977, abandoned.

[51] Int. Cl.$^3$ .............................................. A21C 5/08
[52] U.S. Cl. ........................................ 30/114; 30/303
[58] Field of Search ................. 30/114, 303, 302, 301, 30/272 A, 287, 304, 305, 315, 316

[56] References Cited

U.S. PATENT DOCUMENTS

| | | | |
|---|---|---|---|
| 489,647 | 1/1893 | Coe | 30/303 |
| 832,859 | 10/1906 | Hawk | 30/303 |
| 1,453,367 | 5/1923 | Schipplock et al. | 30/303 |
| 1,603,941 | 10/1926 | Edwards | 30/114 |
| 2,003,253 | 5/1935 | Deutsch | 30/303 |
| 3,276,118 | 10/1966 | Taylor | 30/272 A |

FOREIGN PATENT DOCUMENTS

| | | | |
|---|---|---|---|
| 1013407 | 4/1952 | France | 30/303 |
| 1149738 | 7/1957 | France | 30/114 |
| 2252737 | 6/1975 | France | 30/303 |
| 76301 | 7/1917 | Switzerland | 30/303 |

*Primary Examiner*—Othell M. Simpson
*Assistant Examiner*—J. T. Zatarga
*Attorney, Agent, or Firm*—Robert E. Breidenthal

[57] ABSTRACT

A pizza cutter wherein the plunger is mounted for vertical reciprocation within a guard sleeve by an open spider fixed to the sleeve to expose a cutter mounted on the plunger below the spider for cleaning and visual observation during use. The cutter includes a plurality of radially extending blades detachably mounted on the plunger in an arrangement such that the sleeve, except when removed from the plunger, prevents detachment of the blades.

12 Claims, 10 Drawing Figures

PIZZA CUTTER

This is a continuation of application Ser. No. 826,148, filed Aug. 19, 1977 now abandoned.

The present invention relates to new and useful improvements in cutters, and pertains particularly to cutters having detachable blades.

Food cutters of the type wherein a cutter is mounted on the lower end of a rod that is reciprocable vertically through a wall closing the upper end of a sleeve that embraces the cutter are old and have certain deficiencies.

Among such deficiencies may be mentioned that the food being cut or to be cut is positively obstructed from view or tends to be so when transparent walls become coated with food particles. The structure is not such as to facilitate cleaning or to inspect as to cleanliness without disassembly. Furthermore, cutters heretofore proposed require either entire or substantially replacement when the cutter becomes dull as resharpening of the blades is either impossible or can at best be accomplished with the expenditure of much time and effort. The instant invention is intended to obviate such deficiencies.

The primary object of the present invention is to provide a cutter that produces a plurality of radially extending and angularly spaced cuts such as made with respect to pizzas, pies, and the like, in readying servings of the same, which cutter will include a plurality of detachable blades to enable individual replacement of blades or resharpened or new blades.

Another important object of the present invention is to provide a vertically reciprocable food cutter for cutting food against which it is downwardly impinged, wherein the cutter is disposed within and carried by a shield sleeve in an open arrangement such that the cutter can be directly viewed during use and such as to enable the cutter to be easily and positively cleaned prior to use.

Still another important object is to provide a cutter well suited to commercial use in food preparation and serving establishments from the standpoints of convenient utilization, durability under hard usage, and adherence to the highest standards of cleanliness in food preparation.

A broad aspect of the invention involves in a cutter for pizza and the like of the type including a vertically reciprocable plunger carrying blade means at its lower end adapted to cut pizza engaged thereby on downward movement of the plunger, an improved means for supporting and guiding the plunger comprising a horizontally disposed annular member adapted to be disposed about a pizza and to share a common support therewith, a guide means for slidingly and guidingly receiving the plunger therethrough, said guide means being provided with angularly spaced and radially extending arms having extremities secured to the annular member, and means for yieldingly urging the plunger upward relative to the guide means to a limiting position, the arrangement being such that the annular member can be oriented relative to a pizza as desired by visually observing the latter between the arms of the guide means.

A somwhat narrower aspect of the invention entails in a cutter, the improvement comprising a plurality of angularly spaced, radially extending blade holders mounted upon one end of an axially extending actuating rod, each of said blade holders being provided with a cutter blade, securing means for detachably securing each cutter blade to its respective holder, each of said blades having a cutting edge presented in a direction opposite the extent of the rod and lying in a plane normal to the axis of the rod.

The invention can be best appreciated in the light of the following description of a preferred embodiment of the same, such description being given in conjunction with the accompanying drawings illustrative of the same, wherein.

Figure 1:
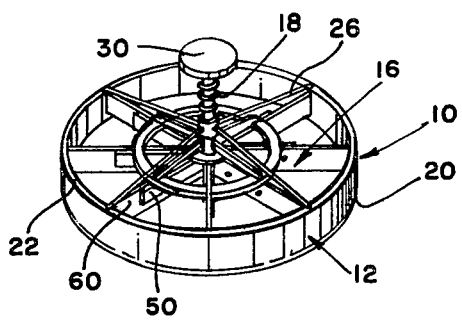
FIG. 1 is an isometric view of the cutter on a reduced scale.

Referring now to the drawings wherein like numerals designate like parts throughout the various views, the reference numeral 10 designates the cutter generally, the same being comprised to two relatively major subassemblies, namely, a guard sleeve or shield 12 carrying an open spider mounted bearing structure 14, and a blade assembly 16 carried by a plunger 18.

The shield 12 is an essentially cylindrical sleeve of stainless steel having a bead 20 rolled therein adjacent its lower end to strengthen the same against permanent deformation from a circular configuration should the cutter be mishandled. Such strength is further enhanced by the sleeve 12 having an integral inturned lip 22.

A cylindrical bearing 24, which also can be of stainless steel, is coaxially disposed above the sleeve 12 and is secured thereto by a plurality of circumferentially spaced, radially extending stainless steel arms 26 having their opposite ends welded to the bearing 24 and the sleeve lip 22 in an open spiderlike configuration. It will be noted that interior of the sleeve 12 is largely unobstructed insofar as visual and physical contact from above is concerned.

The plunger 18 is a cylindrical rod of stainless steel slidingly reciprocable through and rotatable in the bearing 24. An enlarged knob 30 is removably secured to the upper end of the plunger 18 by threaded means, not shown. The internal threading of the knob 30 and on the plunger rod 18 is preferably fine so that hand tightening of the knob 30 on the plunger rod 18 is sufficient to assure against inadvertent separation. If deemed necessary or expedient, a conventional set screw, not shown, can be provided in the knob 30 to bear against the plunger rod 18 to prevent the knob 30 being inadvertently unscrewed. The knob 30 can be of stainless steel or a synthetic thermosetting resin if desired.

For a purpose to be presently explained, a coiled compression spring 32, preferably also of stainless steel, embraces the plunger rod 18 and has its opposite ends seated against the bearing 24 and the knob 30.

Means is provided for mounting the blade assembly 16 upon the lower end of the plunger rod 18, such means comprising a horizontal annular disc or plate 38 concentrically welded to the lower end of the plunger rod 18. An annular plate 40 concentric with and coplanar with the disc 38 is fixed to the plunger 18 by a plurality of upwardly convergent brace arms 42 having their lower ends welded to the plate 40 and their upper ends welded to the plunger rod 18. The plates 38 and 40, as well as the braces, are preferably stainless steel.

A plurality of blade holders 50 are fixedly secured to the plates 38 and 40. Each of the blade holders is planar and of generally rectangular configuration and is disposed with its minor rectangular dimension vertically disposed and with its major rectangular dimension extending in a generally radial direction from the axis of the plunger rod 18.

The holders 50 are equiangularly spaced from each other, and have their radially innermost ends spaced from the axis of the plunger rod 18. All the blade holders 50 have their upper edges 52 welded to the plates 38 and 40. The blade holders 50 are also preferably of stainless steel.

For a reason subsequently to become apparent, the blade holders 50 do not lie in planes coincident with the axis of the plunger rod 18 but are in closely spaced parallelism to such planes.

Associated with each blade holder 50 is a planar and generally rectangular cutter blade 60 of stainless steel, the same being seated flush against one side 62 of its respective blade holder 50 and lies in a plane that coincides with the axis of the plunger rod 18.

Figure 6:
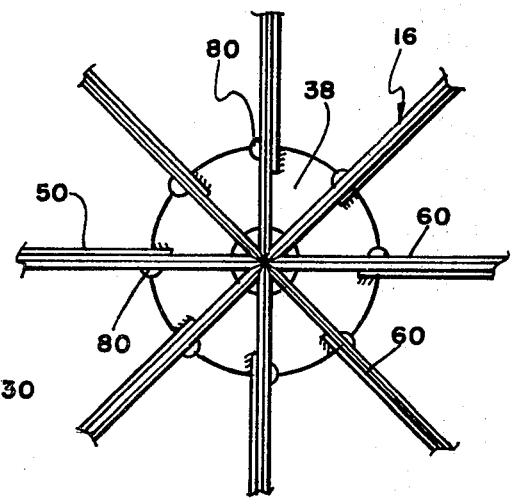
FIG. 6 is a fragmentary vertical sectional view taken upon the plane of the section line 7—7 in FIG. 5.
Figure 4:
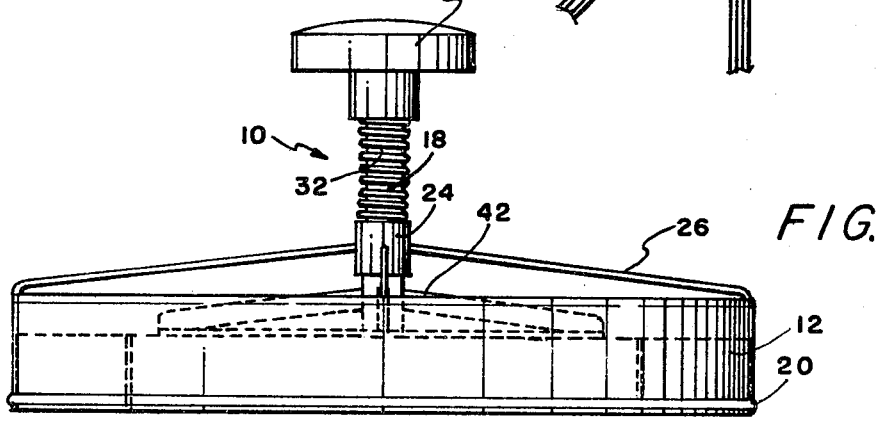
FIG. 4 is a view similar to FIG. 3, but with the cutter having its plunger in its lowered position.

The radially innermost end 64 of the blade 60 is wedge shaped and terminates in an edge 66 at the axis of the plunger rod 18. The dihedral angle defined by the wedge-shaped end 64 of the blade 60 is equal to 360° divided by the number of blades 60 so that each blade 60 is seated flush against the blades 60 adjacent thereto at their radially innermost ends. Such seating of the innermost ends of the blades 60, best shown in FIG. 6, results in the blades 60 lending mutual support to each other as well as enabling all the radial cuts produced by the cutter 10 to extend from a central point.

The lower edges 70 of the blades are wedge shaped or sharpened and such edges lie in a common horizontal plane spaced below the blade holders 50.

It is thought well within the skill of the art to curve the outer end portions of the sharpened edges 70 so that the cutting edges 70 of the blades 60 conform, for example, to the shape of the inside of a pie pan or the like.

As clearly shown in the drawings, the blades 60 extend radially outward of the blade holders 50.

The blades 60 are detachably retained in the assembled relationship described above by the provision of studded head and keyhole means now to be described.

Figure 7:
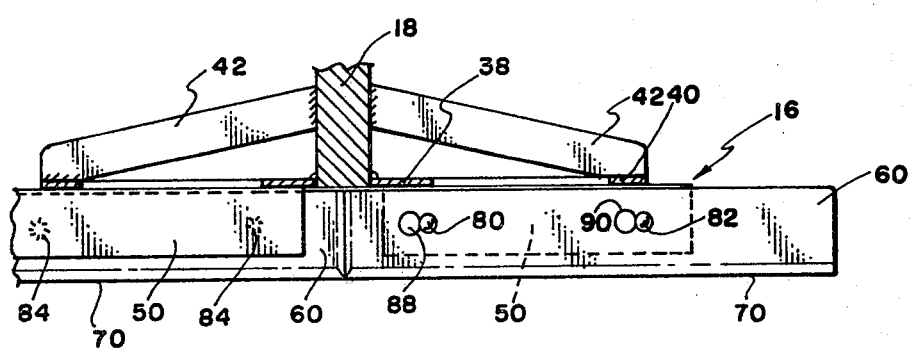
FIG. 7 is a cross section on 7—7 of FIG. 5.
Figure 8:
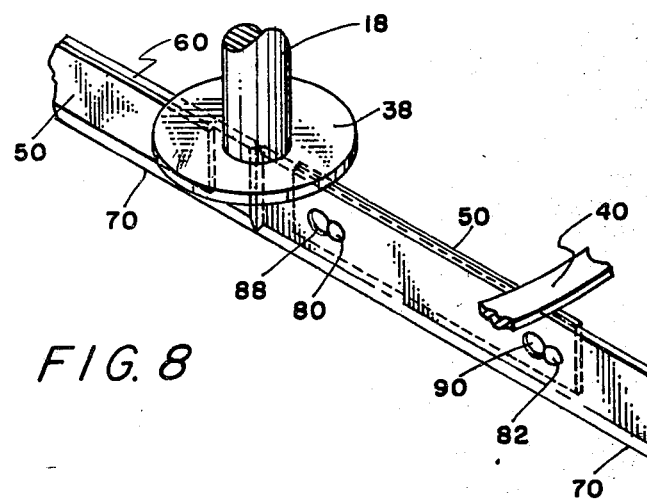
FIG. 8 is a fragmentary isometric view illustrating the lower end of the plunger and its attachment to one of the blade holders and its associated blade, together with a partial showing of a diametrically opposed blade structure; all other blade structures being deleted from the view.
Figure 9:
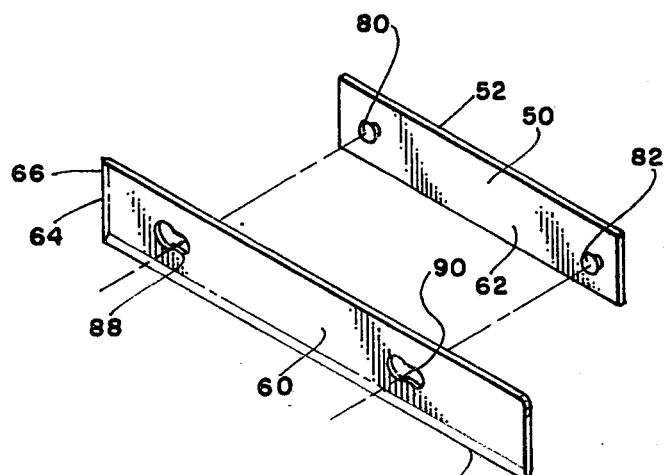
FIG. 9 is an exploded view of a blade holder and its associated blade.
Figure 10:
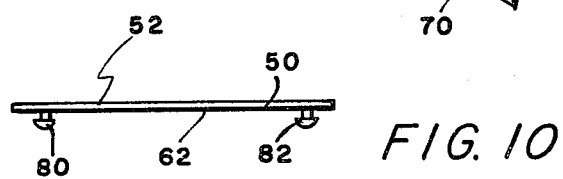
FIG. 10 is a top view of a blade holder.

Each blade holder 50 has a pair of spaced headed studs 80 and 82 fixed to the side 62 thereof, preferably by electric resistance welding as suggested at 84 in FIG. 7 where the side of the holder 50 is dimpled opposite the studs 80 and 82. Like the holder 50 and blades 60, the headed studs 80 and 82 are preferably stainless steel.

The headed studs 80 and 82 coact with a pair of keyhole slots 88 and 90 in the blade 60.

In the previously described assembled relationship of the blades 60 and their holders, the studs 80 and 82 extend through the radially outward narrow portions of the slots 88 and 90, and in such positions the headed studs prevent separation or detachment of a blade 60 except when the blade 60 is moved radially outward sufficiently to register the headed studs 80 and 82 with the radially inward larger ends of the slots 88 an 90, whereupon the blade 60 can be disengaged from he headed studs 80 and 82.

Figure 5:
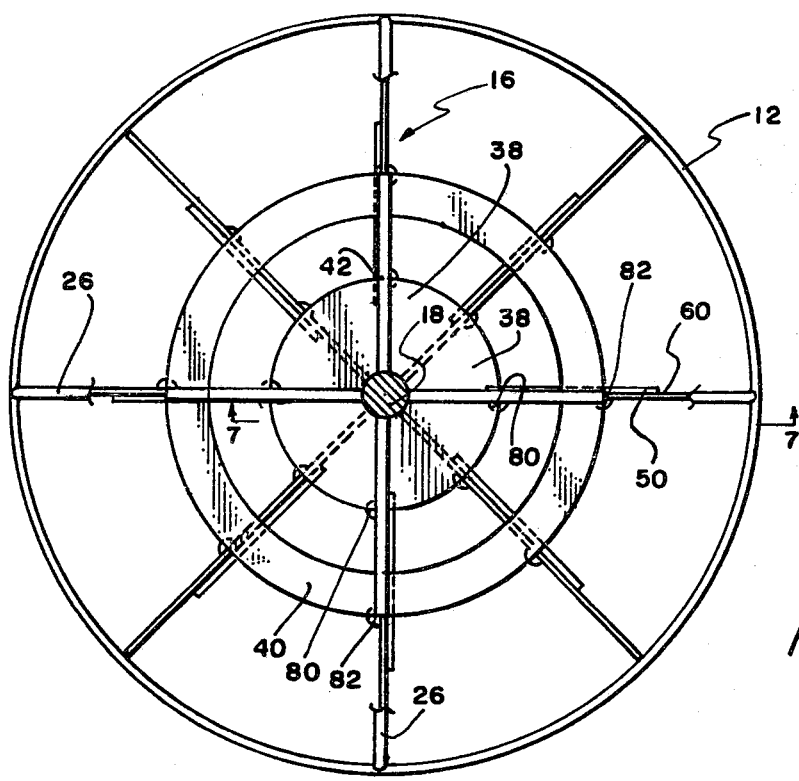
FIG. 5 is a horizontal sectional view of the plunger and the blade structure carried thereby, the view being taken upon the plane of the section line 5—5 in FIG. 3.

When the shield 12 ad the plunger 18 are assembled as previously descrbed, as shown in FIG. 5 the radial extent ofthe blades 60 is such that while free running clearace is afforded between the radial extremities of he blades 60, the blades 60 are sustantially denie radial outward movement such as required for their detachment. As the blades 60 are embraced by the shield 12 at all times except when the plunger rod 18 is withdrawn from the bearing 24, it will be evident that detachment of the blades can only be effected on removing the knob 30 and withdrawing the plunger rod 18 from the bearing 24 so as to free the blades 60 from radial restraint.

Figure 3:
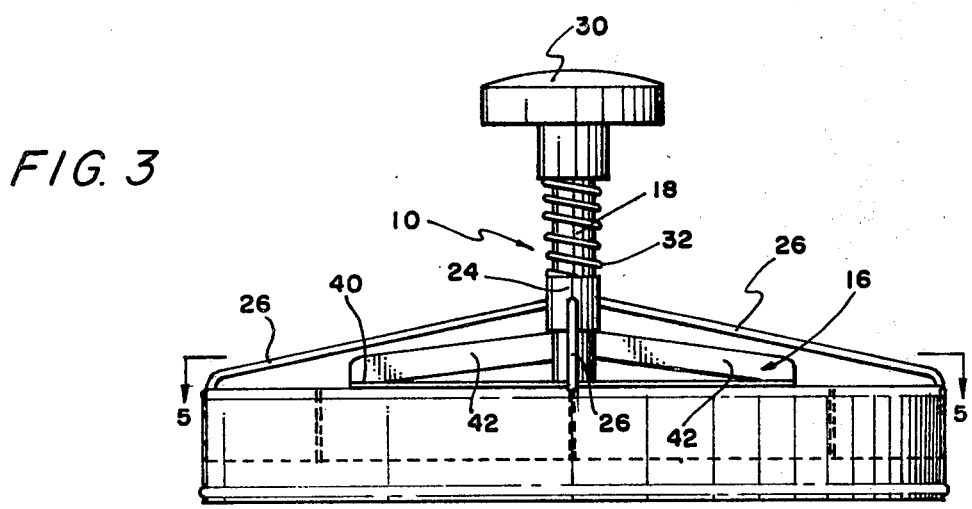
FIG. 3 is an enlarged side elevational view of the cutter in readiness for use with hidden details being shown in dashed outline.
Figure 2:
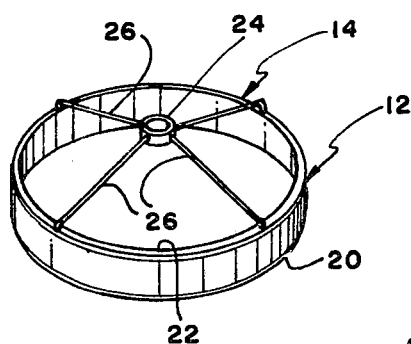
FIG. 2 is an isometric view of the shield and the open spider bearing structure.

The spring 32 normally elevates the plunger rod 18 to an extent limited by engagement of the braces 42 with the bearing 24 and elevating the cutting edges 70 of the blades 60 an interval above the bottom of the shield 12 so that the cutter is in the condition shown in FIG. 3. Such is the normal condition of the cutter 10.

The cutter 10 can then be lifted by the knob 30 and placed so that the shield 12 is disposed about a pizza, not shown. Proper orientation of the cutter with a pizza is facilitated by direct observation of the pizza through the cutter 10. On obtaining proper registry the knob 30 is forced downwardly against the resiliency of the spring 32 so that the cutting edges 70 of the cutter blades 60 impinge against and cut through the pizza. The knob 30 is allowed to rise through the action of the spring 32 and the cutter 10 is then lifted to orient the same for cutting another pizza. If desired, the cutter 10 is not lifted until after the plunger is rotated an angle approximately one-half the angular spacing of the blades 60, and the knob 30 again forced downwardly. In this manner serving one-half size can be obtained. In such application, the direct viewing of the pizza through the cutter 10 is especially helpful.

The open construction of the cutter 10 enables easy cleaning of the same without requiring any particular orientation of the same (right side, upside down, etc.) when placed in a utensil cleaning machine. However, when desired or required, the cutter 10 can be readily disassembled to an extraordinary degree affording substantial and accessible exposure of all surfaces.

Any blade 60 that becomes dull can be easily sharpened with considerable precision without the benefit of special tools, and in any event any particular blade can be resharpened or replaced without the need for or the expense of replacing any of the other blades.

It will be noted that the radially outward upper corner of each blade 60 is sloped or curved as indicated at 96, whereby a camming action can be realized on assembling the cutter 10 to urge the blades into their radially inward position, such camming being any engagement of the shield 12 with such curved corners 96.

Attention is now directed to the appended claims in order to ascertain the actual scope of the invention.

We claim:

1. In a cutter for pizza and the like of the type including a vertically reciprocable plunger carrying blade means at its lower end adapted to cut pizza engaged thereby on downward movement of the plunger, and improved means for supporting and guiding the plunger comprising a horizontally disposed annular member having open upper and lower ends, said annular member being adapted to be lowered into a position such that its lower end may be disposed about a pizza and to share a common support therewith, a guide means carried by the annular member for slidingly and guidingly receiving the plunger therethrough, said guide means slidingly receiving the plunger therethrough and having fixed thereto a plurality of angularly spaced and radially extending arms having extremities secured to the annular member, and means for yieldingly urging the plunger upward relative to the guide means to a limiting position, with said blade means being below the guide means and within the annular member when the plunger is in its limiting position, the arrangement being such that the annular member can be oriented relative to a pizza as desired by visually observing the latter between the arms of the guide means.

2. The combination of claim 1, wherein the annular member is an upstanding hollow guard sleeve having an upper edge, and wherein the arms are secured to the sleeve to extend radially inwardly from the upper edge of the sleeve.

3. The combination of claim 2, wherein said blade means comprises a horizontal plate disposed adjacent the lower end of the plunger, a plurality of vertically inclined braces having upper ends fixed to the plunger and lower ends fixed to the plate, with said braces being disposed below the guide means when the plunger is in its limiting position, a plurality of angularly spaced, radially extending knife blades having downwardly facing cutting edges, with said blades being disposed below and connected to the plate.

4. The combination of claim 2, wherein said blade means comprises a horizontal plate fixedly secured to the plunger and disposed adjacent the lower end of the latter, a plurality of angularly spaced radially extending knife blades having downwardly facing cutting edges, with said blades being disposed below and connected to the plate by means comprising a plurality of blade holders equal in number to the number of blades with each of the blade holders being operatively associated with one of said blades, each of said blade holders and its associated blade including means for detachably attaching them together, with said guard sleeve constituting means for preventing detachment of any of said blades from its associated blade holder when the blade means are disposed within the guard sleeve.

5. The combination of claim 4, wherein the means for detachably attaching the blade to its associated blade holder is operative for detachment of the blade in response to a predetermined amount of radially outward movement of the blade relative to its associated blade holder, with said guard sleeve having an internal radius such as to prevent said amount of radially outward movement of the blade when the blade means are within the guard sleeve.

6. The combination of claim 5, wherein the radially innermost extremity of each blade is wedge shaped and is seated against the corresponding extremity of the blades circumferentially adjacent thereto.

7. The combination of claim 4 including means normally operative to prevent movement of the blades means from within the guard sleeve, with said last means including means for making the same inoperative, whereby the blade means can be moved from within the guard sleeve so that the blades can be detached from the blade holders.

8. The combination of claim 4, wherein the means for detachably attaching the blades and the blade holders include headed stud and mating keyhold means.

9. In a cutter, the improvement comprising a vertically extending actuating rod having a vertical axis and a lower end, a plurality of knife blades that are disposed adjacent the lower end of the rod and having downwardly facing cutting edges, said blades being angularly spaced from each other and extending radially from the axis of the rod, means for detachably connecting the blades to the rod comprising a plurality of blade holders equal in number to the number of blades, said blade holders being fixedly mounted upon the rod adjacent the lower end of the latter, each blade holder being paired with a blade, with each pair being provided with coacting means for detachably attaching the blade to the blade holder and operative to effect detachment upon a predetermined radial outward movement of the blade relative to the blade holder, and means for normally preventing said radial outward movement of the blades relative to their respective blade holders comprising a vertically extending substantially cylindrical sleeve coaxial with the rod, said sleeve normally surrounding the blades and being mounted on the rod for guided vertical movement relative thereto, with means being provided for normally limiting relative vertical movement of the sleeve and the rod to a range such that the sleeve surrounds and prevents detachment of the blades.

10. The combination of claim 9, including means for disabling the last recited means, whereby the sleeve can be moved from surrounding the blades to enable detachment of the blades.

11. The combination of claim 9, wherein each of said blades has a wedge-shaped radially innermost end that is seated against the radially innermost wedge-shaped ends of the blades adjacent thereto.

12. The combination of claim 9, wherein the means for detachably connecting the blades and the blade holders includes headed stud and mating keyhold means.

* * * * *